(12) United States Patent
Lee et al.

(10) Patent No.: US 10,003,784 B2
(45) Date of Patent: Jun. 19, 2018

(54) STEREO IMAGE MATCHING APPARATUS AND METHOD REQUIRING SMALL CALCULATION

(71) Applicant: HYUNDAI MOTOR COMPANY, Seoul (KR)

(72) Inventors: Dong Ha Lee, Seoul (KR); Jae Hong Lee, Incheon (KR); Tae Gon Park, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 15/367,770

(22) Filed: Dec. 2, 2016

(65) Prior Publication Data

US 2018/0014001 A1 Jan. 11, 2018

(30) Foreign Application Priority Data

Jul. 5, 2016 (KR) .......................... 10-2016-0084870

(51) Int. Cl.
H04N 13/00 (2018.01)

(52) U.S. Cl.
CPC ....... *H04N 13/004* (2013.01); *H04N 13/0022* (2013.01)

(58) Field of Classification Search
CPC .......................... H04N 13/004; H04N 13/0022
USPC .......................................................... 348/43
See application file for complete search history.

(56) References Cited

U.S. PATENT DOCUMENTS

2008/0037862 A1  2/2008  Jeon et al.
2015/0281672 A1  10/2015  Lee et al.

FOREIGN PATENT DOCUMENTS

| KR | 10-2008-0001093 A | 1/2008 |
| KR | 10-2013-0058611 A | 6/2013 |
| KR | 2014-0000833 A | 1/2014 |
| KR | 10-2014-0032283 A | 3/2014 |
| KR | 10-2014-0040407 A | 4/2014 |
| KR | 10-2015-0051388 A | 5/2015 |

OTHER PUBLICATIONS

Korean Notice of Allowance issued in Application No. 10-2016-0084870 dated Jun. 14, 2017.

*Primary Examiner* — Nguyen Truong
(74) *Attorney, Agent, or Firm* — McDermott Will & Emery LLP

(57) ABSTRACT

A stereo image matching apparatus includes a processor which includes: a bit distributor distributing values of each pixel of stereo images into sequential N bits and outputting a plurality of stereo images including the sequential N bits; a plurality of cost calculators each receiving the plurality of stereo images and calculating matching cost values for each pixel of each of the stereo images; a confidence calculator calculating a matching confidence by using cost characteristics lit of the respective matching cost values calculated by the plurality of cost calculators; and a depth determiner determining that a depth value of which the matching confidence is high and the matching cost values are relatively low is a final depth value.

9 Claims, 3 Drawing Sheets

STEREO IMAGE MATCHING APPARATUS AND METHOD REQUIRING SMALL CALCULATION

CROSS-REFERENCE TO RELATED APPLICATION

This application is based on and claims the benefit of priority to Korean Patent Application No. 10-2016-0084870, filed on Jul. 5, 2016 in the Korean intellectual Property Office, the disclosure of which incorporated herein in its entirety by reference.

TECHNICAL FIELD

The present disclosure relates to a stereo image matching technology, and more particularly, to a stereo image matching apparatus and method requiring small calculation, capable of decreasing a calculation amount of stereo matching.

BACKGROUND

In accordance with the development of various sensor and camera technologies, and a study on an autonomous driving technology through a combination of sensor and camera technologies has been actively conducted.

In the autonomous driving technology, a stereo camera serving as an eye of a vehicle is a very important element understanding a position and movement of an obstacle in front of the vehicle.

Generally, in an image processing technology using the stereo camera, a matching cost calculating process through comparison of similarity between left and right images, a cost optimizing process, and a final depth determining process are performed.

Among them, the matching cost calculating process is repeatedly performed for all pixels of an image. Therefore, as an amount of image data is increased, a rapid increase in a calculation amount and a logic load is generated.

Since a data amount of a high dynamic range (HDR) image is 1.5 to 2 times larger than that of a low dynamic range (LDR) image according to the related art, when a stereo matching algorithm according to the related art is applied to the HDR image as it is, a calculation speed is rapidly decreased.

SUMMARY

The present disclosure has been made to solve the above-mentioned problems occurring in the prior art while advantages achieved by the prior art are maintained intact.

An aspect of the present disclosure provides a stereo image matching apparatus and method requiring small calculation, capable of decreasing a calculation amount of stereo matching.

An aspect of the present disclosure is not limited to the above-mentioned aspect. That is, other aspects that are not mentioned may be obviously understood by those skilled in the art from the following specification.

According to an exemplary embodiment of the present disclosure, a stereo image matching apparatus includes at least one processor which includes: a bit distributor distributing values of each pixel of stereo images into sequential N bits and outputting a plurality of stereo images including the sequential N bits; a plurality of cost calculators each receiving the plurality of stereo images and calculating matching cost values for each pixel of the stereo images; a confidence calculator calculating a matching confidence by using cost characteristics of the respective matching cost values calculated by the plurality of cost calculators; and a depth determiner determining that a depth value of which the matching confidence is high and the matching cost values are relatively low is a final depth value.

According to another exemplary embodiment of the present disclosure, a stereo image matching method by at least one processor includes: distributing values of each pixel of stereo images into sequential bits and outputting a plurality of stereo images including the sequential bits; receiving the plurality of stereo images and calculating matching cost values for each pixel of the stereo images; calculating a matching confidence by using cost characteristics of the matching cost values for the plurality of stereo images; and determining that a depth value of which the matching confidence is high and the matching cost values are relatively low is a final depth value.

The step of determining, may include: selecting cost values to determine the final depth value among the matching cost values for the plurality of stereo images by using the matching confidence; and calculating depth value corresponding to a first minimum among the selected cost values as the final depth value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned aspect, and other aspects, advantages, and features of the present disclosure and methods accomplishing them will become apparent from the following detailed description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Terms used in the present specification are for explaining exemplary embodiments rather than limiting the present disclosure. In the present disclosure, a singular form includes a plural form unless explicitly described to the contrary. Components, steps, operations, and/or elements mentioned by terms "comprise" and/or "comprising" used in, the present disclosure do not exclude the existence or addition of one or more other components, steps, operations, and/or elements.

Figure 1:
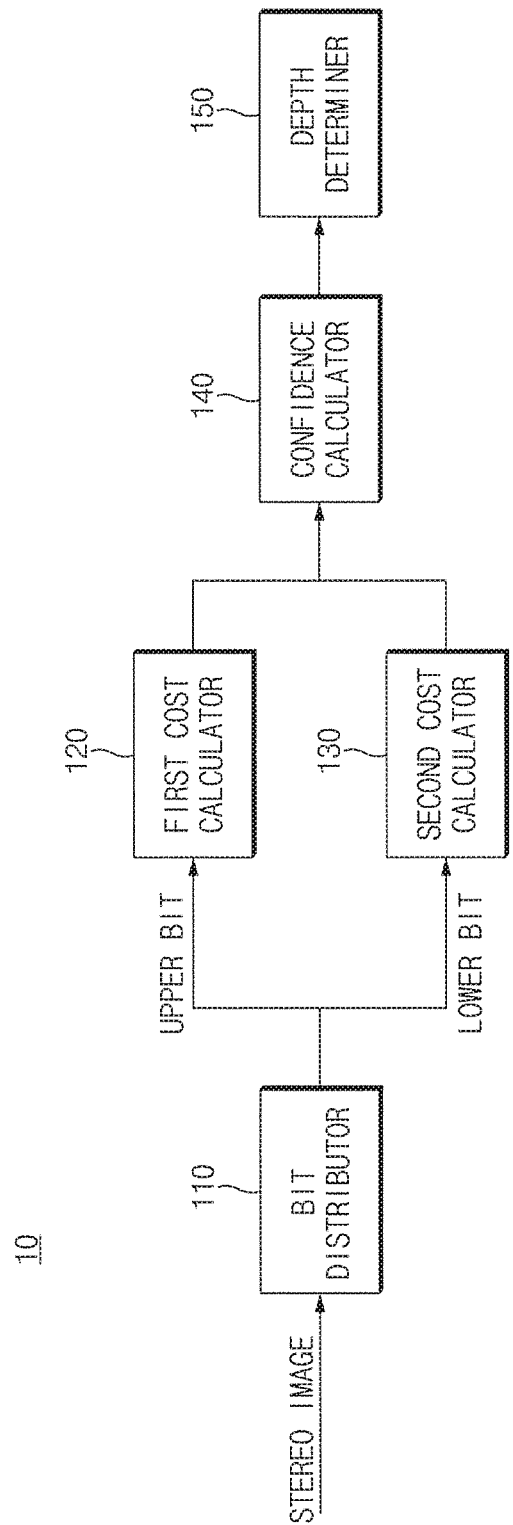
FIG. 1 is a block diagram illustrating a stereo image matching apparatus according to exemplary embodiment of the present disclosure.

Hereinafter, exemplary embodiments of the present disclosure will be described in detail with reference to the accompanying drawings. FIG. 1 is a block diagram illustrating a stereo image matching apparatus according to an exemplary embodiment of the present disclosure.

As illustrated in FIG. 1, a stereo image matching apparatus 10 according to an exemplary embodiment of the present disclosure includes a bit distributor 110, a plurality of cost calculators 120 and 130, a confidence calculator 140, and a depth determiner 150.

The bit distributor 110 receives stereo images (a left image and a right image), distributes the respective bits the received stereo images into a plurality of sequential N bits, and outputs the plurality of sequential N bits in parallel with each other. For example, when each pixel of the left image and the right image includes 16 bits, the bit distributor 110 may distribute data of each pixel of the stereo images into upper 8 bits and lower 8 bits and output the upper 8 bits and the lower 8 bits.

Here, N may be a multiplier of 2. Therefore, when a total number of bits of the data of each pixel of the stereo images is not a multiplier of 2, the bit distributor 110 may overlappingly output some of the bits of the data of each pixel. For example, when each pixel of the left image and the right image includes 12 bits, the bit distributor 110 may distribute data of each pixel of the stereo images into upper 8 bits and lower 8 bits in which intermediate 4 bits are overlappingly included.

In the following specification, a case in which the bit distributor 110 distributes the stereo image into stereo images including upper bits and stereo images including lower bits will be described by way of example.

The plurality of cost calculators 120 and 130 receive the stereo images including the N bits output in parallel with each other, respectively, and calculate stereo image matching costs.

In detail, the first cost calculator 120 receives a left image including the upper bits and a right image including the upper bits, and calculates matching costs (hereinafter, referred to as first cost values) by using values of pixels corresponding to the same line of the left image and the right image. Here, the first cost calculator 120 may calculate the first cost values by using a region based cost evaluation method such as a sum of absolute difference (SAD), a sum of squared difference (SSD), or the like.

The second cost calculator 130 performs processing corresponding to that of the first cost calculator 120 on a left image including the lower bits and a right image including the lower bits to calculate second cost values.

In addition, the first and second cost calculators 120 and 130 output a first cost set which includes the first cost values and a second cost set which includes the second cost values, respectively, with respect to all pixels of the input stereo images.

The confidence calculator 140 calculates matching confidence by using cost characteristics of the first and second cost sets. In detail, the confidence calculator 140 may calculate matching confidence (conf(C)) between the first cost set and the second cost, set by using the following Equation 1.

$$\text{Conf}(C) = a*\text{MinRatio}(C) + b*\text{Var}(C) \quad \text{[Equation 1]}$$

Here, $C(=C(d)=C(d))$ is a matching cost changed depending on a depth value (Depth), and Var(C) is a variance value of matching costs. MinRatio(c) is represented by the following Equation 2, and a and b are any constants that are experimentally obtained. For example, values of a and b may be determined through a process of calculating a parallax between stereo images while changing the values of a and b and comparing the parallax with a reference parallax.

$$\text{MinRatio}(C) = \left(1 - \frac{1 - C_s}{1 - C_f}\right) \quad \text{[Equation 2]}$$

Here, $C_f$ is a first minimum of the matching costs, and $C_s$ is a second minimum of the matching costs. Here, it may be appreciated that the larger the change in the matching costs depending on the parallax and the larger the difference between the first minimum and the second minimum of the matching costs, the larger the matching confidence (conf (C)).

The depth determiner 150 calculates a final depth as represented by the following Equation 3 by using the matching confidence calculated by Equation 2.

$$d = \text{argmin}(C_m)$$

$$C_m = \text{argmax}(\text{Conf}(C_0 \ldots C_{n-1})) \quad \text{[Equation 3]}$$

In more detail, the depth determiner 150 may select a cost set making the matching confidence high, of the first and second cost sets for each pixel, and determine that a depth value corresponding to a first minimum within the selected cost set is to the final depth value for each pixel.

Then, the depth determiner 150 or another component may configure a parallax map by using the final depth values.

Figure 2:
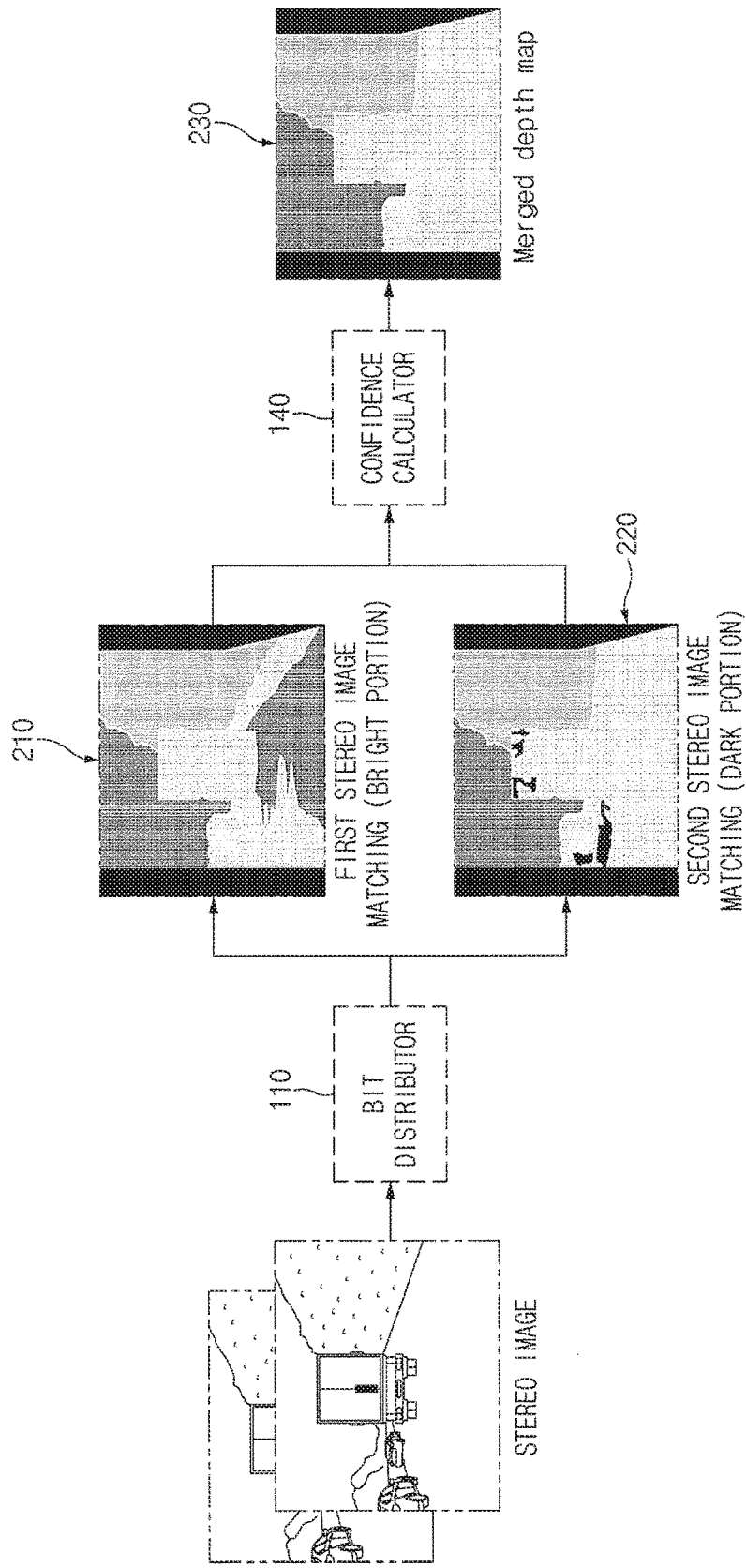
FIG. 2 is a view illustrating matching images of the stereo image matching apparatus according to an exemplary embodiment of the present disclosure.

Hereinafter, an effect of the stereo image matching apparatus according to an exemplary embodiment of the present disclosure will be described with reference to FIG. 2. FIG. 2 is a view illustrating matching images of the stereo image matching apparatus according to an exemplary embodiment of the present disclosure.

As illustrated in FIG. 2, as a matching result 210 of the stereo images including the upper bits, a matching success probability of a bright portion is relatively high, but a plurality of fail regions are generated in a dark portion.

On the other hand, as a matching result 220 of the stereo images including the lower bits, a matching success probability of a dark portion is relatively high, but a plurality of fail regions are generated in a bright portion.

However, in the present disclosure, a depth image 230 in which accuracy is ensured in both of the bright portion and the dark portion may be obtained by merging the matching results of the first and second cost calculators 120 and 130 with each other by using the matching confidence calculated by the confidence calculator 140.

As described above, in the present disclosure, a calculation amount of matching may be significantly decreased while maintaining accuracy equal or similar to that of a method of stereo-matching original images in block, thereby making it possible to signs increase a processing speed. When stereo matching is performed on 16-bit stereo images in the present disclosure, a calculation amount of matching may be decreased up to 50% as compared with a scheme of matching 16-bit stereo images in block according to the related art.

In addition, in the present disclosure, a matching failure phenomenon occurring in the bright portion or the dark portion when a high dynamic range (HDR) image of which texture expressiveness of the bright portion and the dark portion are more excellent than that of a low dynamic range (LDR) image according to the related art is stereo-image-processed may be significantly improved.

Furthermore, a controller used in an LDR may be utilized as it is, and a logic overload phenomenon due to a HDR image input may be significantly improved.

The exemplary embodiment of the present disclosure described above may be applied to a field such as a stereo camera module of an autonomous driving system, an advanced driver assistant system (ADAS) camera module, an ADAS integrated controller module, and the like, thereby making it possible to decrease a calculation amount of matching and increase a processing speed.

Figure 3:
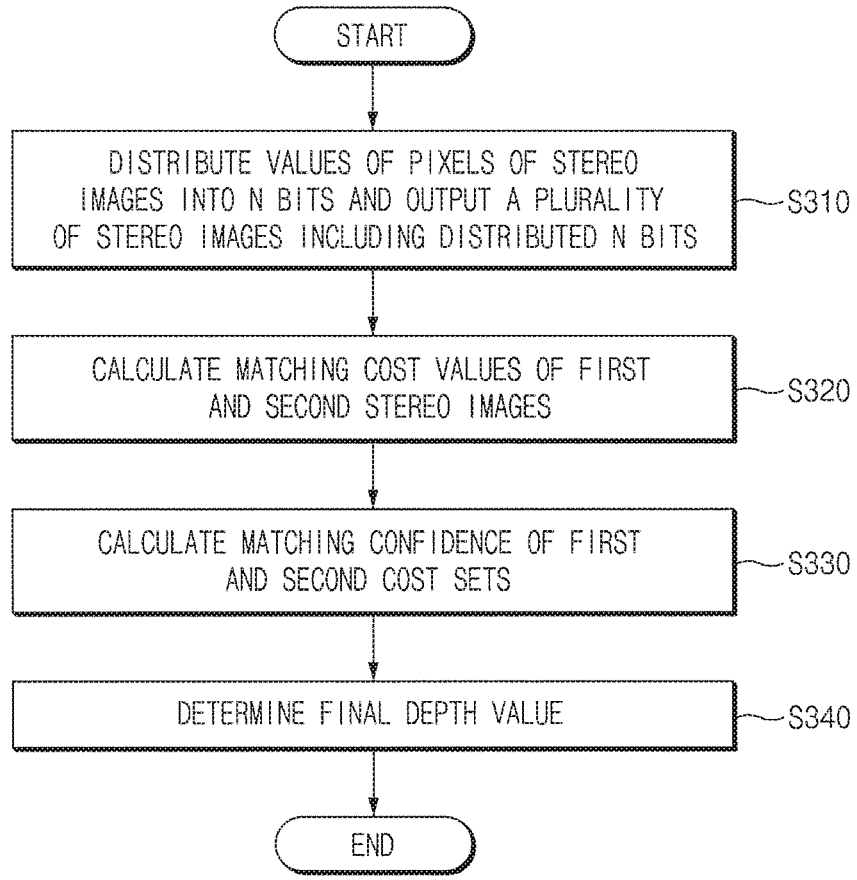
FIG. 3 is a flow chart illustrating a stereo image matching method according to an exemplary embodiment of the present disclosure.

Hereinafter, a stereo image matching method according to an exemplary embodiment of the present disclosure will be described with reference to FIG. 3. FIG. 3 is a flow chart illustrating a stereo image matching method according to an exemplary embodiment of the present disclosure.

Referring to FIG. 3, the bit distributor 110 distributes values of each pixel of the stereo images into sequential N bits, and outputs a plurality of stereo images including the distributed N bits (S310). Here, when a total number of bits of the data of each pixel of the stereo images is not a multiplier of 2, the bit distributor 110 may overlappingly output bits adjacent to other N bits among the distributed N bits, if necessary.

The first and second cost calculators 120 and 130 calculate matching cost values for each pixel of first and second stereo images (S320). In detail, the first and second cost calculators 120 and 130 may calculate cost values for all pixels of the first and second stereo images, and output first and second cost sets for each pixel.

The confidence calculator 140 calculates matching confidence by using cost characteristics of the matching cost values of the plurality of stereo images (S330). In this case, the confidence calculator 140 may calculate matching confidence of each cost set.

The depth determiner 150 datelines that a depth value corresponding to a minimum cost value in a cost set having high matching confidence is a final depth value (S340). In this case, the depth determiner 150 selects a cost set having high confidence, which is to be used to determine depth values of each pixel, of the first and second cost sets. In addition, the depth determiner 150 determines that a depth value corresponding to a parallax having the lowest cost in the selected set is the final depth value.

Then, the depth determiner 150 or another component may create a depth map by using the final depth values determined for each pixel.

As described above, in the exemplary embodiment of the present disclosure, a calculation amount of matching may be significantly decreased while maintaining accuracy equal or similar to that of a method of stereo-matching original images in block, thereby making it possible to significantly increase a processing speed.

In addition, in the exemplary embodiment of the present disclosure, a matching failure phenomenon occurring in the bright portion or the dark portion when a high dynamic range (HDR) image is stereo-image-processed may be significantly improved.

As described above, according to the exemplary embodiment of the present disclosure, a calculation amount of stereo matching may be decreased, and a speed may be increased.

In addition, in the present disclosure, a matching failure phenomenon occurring in the bright portion or the dark portion when a high dynamic range (HDR) image of which texture expressiveness of the bright portion and the dark portion are more excellent than that of a low dynamic range (LDR) image according to the related art is stereo-image-processed may be significantly improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A stereo image matching apparatus comprising at least one processor which includes:
   a bit distributor distributing values of each pixel of stereo images into sequential N bits and outputting a plurality of stereo images including the sequential N bits;
   a plurality of cost calculators each receiving the plurality of stereo images and calculating matching cost values for each pixel of each of the stereo images;
   a confidence calculator calculating a matching confidence by using cost characteristics of the respective matching cost values calculated by the plurality of cost calculators; and
   a depth determiner determining that a depth value of which the matching confidence is high and the matching cost values are relatively low is a final depth value.

2. The stereo image matching apparatus according to claim 1, wherein the confidence calculator calculates the matching confidence by using a ratio of a second minimum to a first minimum of the matching costs of each pixel.

3. The stereo image matching apparatus according claim 2, wherein the confidence calculator calculates the matching confidence by further using a variation of the matching cost values.

4. The stereo image matching apparatus according to claim 1, wherein the depth determiner selects cost values to determine the final depth value among the respective matching cost values calculated by the plurality of cost calculators by using the matching confidence, and calculates a depth value corresponding to a first minimum among the selected cost values as the final depth value.

5. The stereo image matching apparatus according to claim 1, wherein N is a predetermined number, and
   the bit distributor overlappingly outputs some of the bits of the values of each pixel.

6. A stereo image matching method by at least one processor, comprising steps of:
   distributing values of each pixel of stereo images into sequential N bits and outputting a plurality of stereo images including the sequential N bits;
   receiving the plurality of stereo images and calculating matching cost values for each pixel of each of the stereo images;
   calculating a matching confidence by using cost characteristics of the matching cost values for the plurality of stereo images; and
   determining that a depth value of which the matching confidence is high and the matching cost values are relatively low is a final depth value.

7. The stereo image matching method according to claim 6, wherein the step of calculating the matching confidence includes calculating the matching confidence by using a ratio of a second minimum to a first minimum of the matching cost values of each pixel and a variation of the matching cost values.

8. The stereo image matching method according to claim 6, wherein the step of determining includes:
   selecting cost values to determine the final depth value among the matching cost values for the plurality of stereo images by using the matching confidence; and calculating a depth value corresponding to a first minimum among the selected cost values as the final depth value.

9. The stereo image matching method according to claim 6, wherein N is a predetermined number, and
the step of outputting the plurality of stereo images includes overlapping outputting some of the sequential bits of the values of each pixel.

* * * * *